United States Patent
Knoop et al.

(10) Patent No.: US 7,148,738 B2
(45) Date of Patent: Dec. 12, 2006

(54) SYSTEMS, DEVICES, AND METHODS FOR PROVIDING CONTROL SIGNALS

(75) Inventors: James Allen Knoop, Flag Pond, TN (US); Alan D. McNutt, Johnson City, TN (US)

(73) Assignee: Siemens Energy & Automation, Inc., Alpharetta, GA (US)

(*) Notice: Subject to any disclaimer, the term of this patent is extended or adjusted under 35 U.S.C. 154(b) by 36 days.

(21) Appl. No.: 11/059,073

(22) Filed: Feb. 16, 2005

(65) Prior Publication Data

US 2005/0179482 A1  Aug. 18, 2005

Related U.S. Application Data

(60) Provisional application No. 60/545,034, filed on Feb. 17, 2004.

(51) Int. Cl.
*H03K 17/687* (2006.01)
(52) U.S. Cl. .............. 327/437; 327/172; 327/176; 327/434; 327/538
(58) Field of Classification Search ............... None
See application file for complete search history.

(56) References Cited

U.S. PATENT DOCUMENTS

| | | | | |
|---|---|---|---|---|
| 4,423,341 A | * | 12/1983 | Shelly | 327/112 |
| 5,481,219 A | * | 1/1996 | Jacobs et al. | 327/434 |
| 6,185,114 B1 | * | 2/2001 | Matsumoto et al. | 363/21.06 |
| 6,555,935 B1 | * | 4/2003 | Maskovyak et al. | 307/125 |
| 7,028,511 B1 | * | 4/2006 | Cheyne | 68/12.16 |
| 2004/0084640 A1 | | 5/2004 | Chenye et al. | 250/551 |

FOREIGN PATENT DOCUMENTS

| WO | DE3314300 | 10/1984 |
|---|---|---|
| WO | DE3431027 | 7/1985 |

OTHER PUBLICATIONS

PCT International Search Report, mailed Sep. 12, 2005.
PCT Written Opinion.

* cited by examiner

*Primary Examiner*—Timothy P. Callahan
*Assistant Examiner*—An T. Luu

(57) ABSTRACT

Certain exemplary embodiments comprise a system, comprising: an electrical isolator adapted to couple a processor of a programmable logic controller to a user load; a transistor adapted to provide switching of a control signal provided by the processor for the user load; a totem pole output coupling the electrical isolator and the transistor and adapted to switch a gate of the transistor; and a power supply adapted to provide a floating regulated DC voltage to the gate of the transistor.

23 Claims, 4 Drawing Sheets

SYSTEMS, DEVICES, AND METHODS FOR PROVIDING CONTROL SIGNALS

CROSS-REFERENCES TO RELATED APPLICATIONS

This application claims priority to, and incorporates by reference herein in its entirety, pending U.S. Provisional Patent Application Ser. No. 60/545,034, filed 17 Feb. 2004.

BACKGROUND

The central processing unit (CPU) of a programmable logic controllers (PLC) can provide control signals, in the form of pulses, to user loads, such as actuators, relays, heaters, motors, etc. Such loads can be electrically noisy, can require a wide range of pulse frequencies, and/or can require a wide range of pulse voltages, etc.

SUMMARY

Certain exemplary embodiments can: electrically isolate the CPU from user loads; provide pulse frequencies ranging from approximately 0 to approximately 100,000 pulses per second; provide pulse voltages ranging from approximately 0 to approximately 1000 DC volts; control inductive loads; and/or withstand inductive kickback. To provide one or more of these capabilities, certain exemplary embodiments can provide a system comprising one or more of a:

- high speed isolation device, such as a high speed optocoupler having an open collector and/or high speed magnetic coupler, to couple the CPU to the user load;
- P-channel field effect transistor (FET) to provide switching of the control signal for the user load;
- totem pole output between the high speed isolation devices and the FET to timely switch the gate of the FET;
- power supply that is both electrically isolated from the CPU and provides a regulated approximately 5 VDC output that is floating and/or referenced to the user's power supply which can provide from approximately 0 volts DC to approximately 30 volts DC;
- first pull-up resistor electrically connected to the gate of the FET to cause the output to be off during power-up, power-down, and when the system was neither on nor powered, such as to help manage inductive loads;
- second pull-up resistor electrically connected to the high speed isolation device to cause the output to be off during power-up, power-down, and when the system was neither on nor powered;
- pull-down capacitor on the high speed isolation device to prevent the output from switching on during the presence of fast transient and/or burst noise; and/or
- resistor between the totem pole output and the gate of the FET to prevent inductive kick-back from damaging the totem pole output and/or to effect the turn-off speed of the FET output.

BRIEF DESCRIPTION OF THE DRAWINGS

A wide variety of potential embodiments will be more readily understood through the following detailed description of certain exemplary embodiments, with reference to the accompanying exemplary drawings in which.

DEFINITIONS

Figure 1:
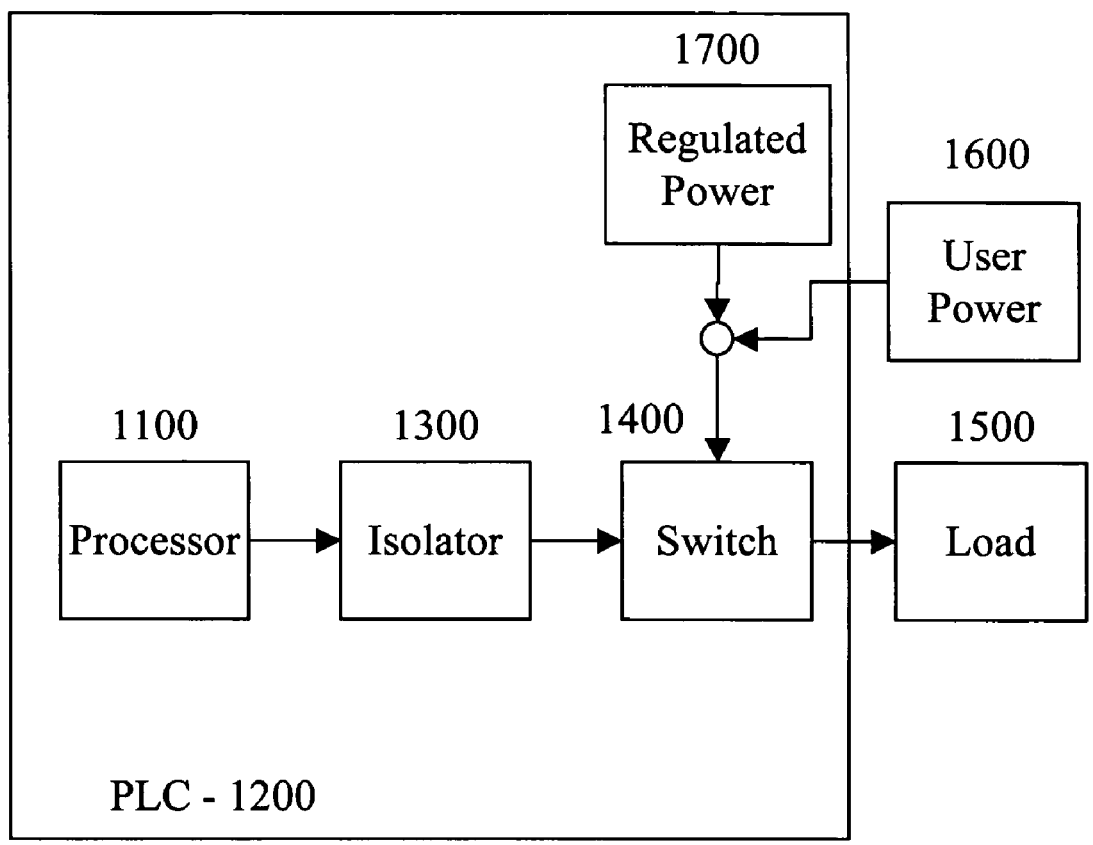
FIG. 1 is a block diagram of an exemplary embodiment of a system 1000.

When the following terms are used herein, the accompanying definitions apply:

- adapted to—made suitable or fit for a specific use or situation.
- apparatus—an appliance or device for a particular purpose
- buffer—a circuit that can be used to isolate one circuit from another.
- can—is capable of, in at least some embodiments.
- comprising—including but not limited to.
- control signal—a signal used for directing and/or exercising authoritative and/or dominating influence over an entity, such as a user load.
- DC—direct current.
- define—to establish the outline, form, or structure of.
- electrical isolator—a device adapted to prevent transmission of electrical noise, transients, spikes, etc.
- field effect transistor (FET)—a type of transistor commonly used for amplification of weak analog or digital signals, for switching DC, and/or functioning as an oscillator.
- floating power supply—an electrical power source that is not fixed and/or referenced to ground. That is, the output and/or return of the power supply can vary with reference to ground.
- gate—a control electrode of a transistor.
- high side—an electrode having the highest voltage.
- inductive kick-back—a voltage induced by cessation of current flow to an inductive load.
- may—is allowed to, in at least some embodiments.
- method—a process, procedure, and/or collection of related activities for accomplishing something.
- open collector—the gate of a transistor that is available for the connection of external loads.
- operable—able to be normally operated.
- optocoupler—a device used to electrically interface between two current-isolated systems. It does this by way of light transmission. In certain exemplary embodiments, the first system can provide current to a light emitting diode (LED). As the current to the LED fluctuates, the light intensity output by the LED will similarly fluctuate. The light from the LED can be incident upon a photodetector which can output a second current that is proportional to the first current supplied to the LED, but electrically isolated from that first current.
- output—the energy, power, work, signal, and/or information produced by a system.
- P-channel field effect transistor—an FET in which current flows along a semiconductor path called the channel. At one end of the channel, there is an electrode called the source. At the other end of the channel, there is an electrode called the drain. The physical diameter of the channel is fixed, but its effective electrical diameter can be varied by the application of a voltage to a control electrode called the gate. The conductivity of the FET depends, at any given instant in time, on the electrical diameter of the channel. A small change in gate voltage can cause a large variation in the current from the source to the drain. In a P-channel FET, the channel is comprised of a P-type semiconductor (P-channel) material; the gate is made of the opposite semiconductor type. In the P-type material, electric charges are carried mainly in the form of electron deficiencies called holes. Normally, this P-N junction is reverse-biased (a DC voltage is applied to it) so that no current flows between the channel and the gate. However, under some conditions there is a small current through the junction during part of the input signal cycle.

plurality—the state of being plural and/or more than one.

power supply—a source of electrical power.

predetermined—established in advance.

processor—a device adapted to execute a set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. In certain embodiments, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

programmable logic controller (PLC)—a digitally operating electronic apparatus which uses a programmable memory for the internal storage of instructions for implementing specific functions such as logic, sequencing, timing, counting and arithmetic to control through digital or analog input/output modules, various types of machines or processes. See NEMA Standard ICS 3-1978, Part ICS3-304(5).

pulse—a transient variation of a quantity (such as electric current or voltage) whose value is otherwise constant. Sometimes repeated either with a regular period or according to some code.

reference pin—an electrode of a transistor, to the voltage of which the voltage of another electrode or device is referenced.

referenced—the state of being related or referred.

regulated—controlled, directed, and/or adjusted according to a particular specification and/or requirement.

set—a related plurality.

signal—an impulse or a fluctuating electric quantity, such as voltage, current, or electric field strength, whose variations represent coded information.

substantially—to a great extent or degree.

switching—allowing and disallowing transmission.

system—a collection of mechanisms, devices, data, and/or instructions, the collection designed to perform one or more specific functions.

totem pole output—two "stacked" transistors in series between a positive voltage and ground, with the output coming from the connection between the two transistors. Also known as a "push-pull" transistor pair.

transistor—a device that regulates current or voltage and acts as a switch or gate for electronic signals.

turn-off speed—a rate and/or duration associated with ceasing output from a circuit.

user load—a system and/or device capable of being controlled by a programmable logic controller, such as an actuator, relay, solenoid, heater, lamp, speaker, sensing device, motor, etc.

user load power supply—a source of electrical power for a user load.

DETAILED DESCRIPTION

Certain exemplary embodiments comprise a system comprising: an electrical isolator adapted to couple a processor of a programmable logic controller to a user load; a transistor adapted to provide switching of a control signal provided by the processor for the user load; a totem pole output coupling the electrical isolator and the transistor and adapted to switch a gate of the transistor; and a floating power supply adapted to provide a regulated DC voltage to the gate of the transistor.

FIG. 1 is a block diagram of an exemplary embodiment of a system 1000, which can comprise a processor 1100 of a programmable logic controller 1200. Control signals generated by the processor 1100 can be transmitted to a switch 1400 via an electrical isolator 1300 that can electrically isolate processor 1100 from switch 1400. Electrical isolator 1300 can be an optocoupler, such as an optocoupler comprising an open collector, and/or a magnetic coupler.

Switch 1400 can comprise a transistor, such as a field effect transistor (e.g., a P-channel FET, an N-channel FET, a MOSFET, and/or a junction FET, etc.) or a bipolar junction transistor, and a totem pole output. A buffer and/or pull-up resistor can be coupled between electrical isolator 1300 and the switch 1400. The pull-up resistor can be coupled to a gate of the transistor and/or can prevent switching of the control signal during certain predetermined events. A pull-down capacitor can be coupled to the output of the optocoupler and/or can prevent switching of the control signal during certain predetermined events.

In certain exemplary embodiments, a protective resistor can coupled between the totem pole output and the gate of the transistor. In certain exemplary embodiments, a pull-up resistor can be coupled to a conductor running between the reference pin of the transistor and the gate of the transistor and also coupled to a diode coupled in series with a zener diode connected between the gate of the transistor and a load side pin of the transistor. The pull-up resistor can be adapted to turn-on the transistor to absorb an inductive kick-back from an inductive user load. The first protective resistor can be adapted to prevent an inductive kick-back from damaging the totem pole output, and/or to effect a turn-off speed of the transistor.

When switched on, switch 1400 can allow the control signals to continue to one or more user loads 1500. Power for the gate of the switch 1400 can come from a floating regulated DC power supply 1700 that is referenced to switch 1400, which can be referenced to a user load power supply 1600. Power supply 1700 can be electrically isolated from processor 1100.

The control signal can comprise a series of pulses having a frequency that is greater than approximately 20,000 pulses per second, such as approximately and/or greater than approximately 21,000; 25,000; 30,000; 40,000; 50,000; 60,000; 70,000; 80,000; 90,000; 100,000; etc., including all values and subranges therebetween.

User load power supply 1600 can be operable from less than approximately 6 volts to greater than approximately 21 volts. Thus, user load power supply 1600 can be operable at approximately 0; 3; 4.5; 5, etc., volts including all values and subranges therebetween (e.g., less than approximately 5 volts; approximately 0 to approximately 4.48 volts; etc.) and at approximately 23; 24; 25.8; 27; 30; 100; 1000, etc., volts, including all values and subranges therebetween.

Figure 2:
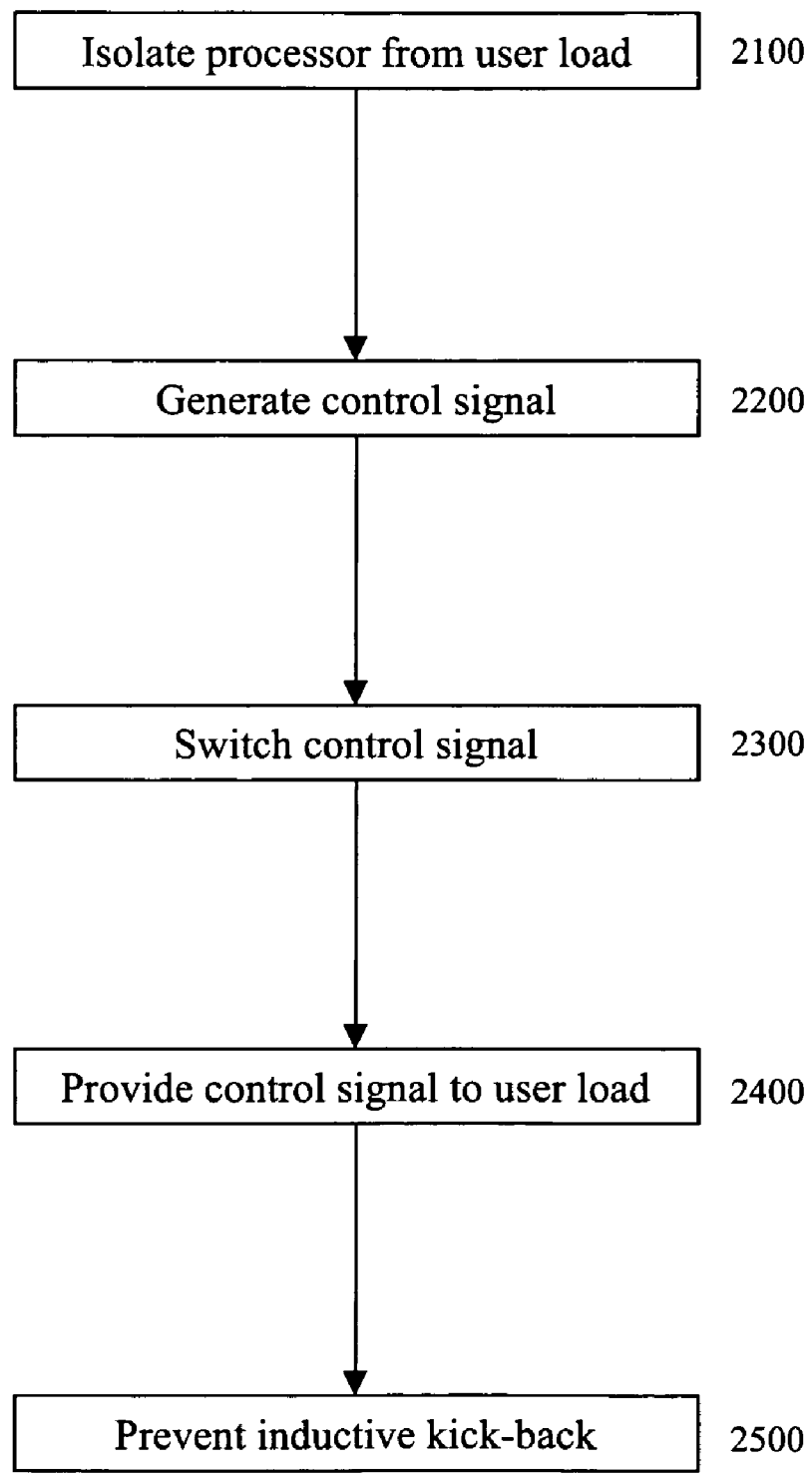
FIG. 2 is a flowchart of an exemplary embodiment of a method 2000.

FIG. 2 is a flowchart of an exemplary embodiment of a method 2000. At activity 2100, a processor is electrically isolated from a user load. At activity 2200, a signal for controlling the user load is generated. At activity 2300, the control signal is switched. At activity 2400, the control signal is provided to the user load. At activity 2500, inductive kick-back generated by inductive user loads is prevented from reaching and/or damaging the switch.

Figure 3:
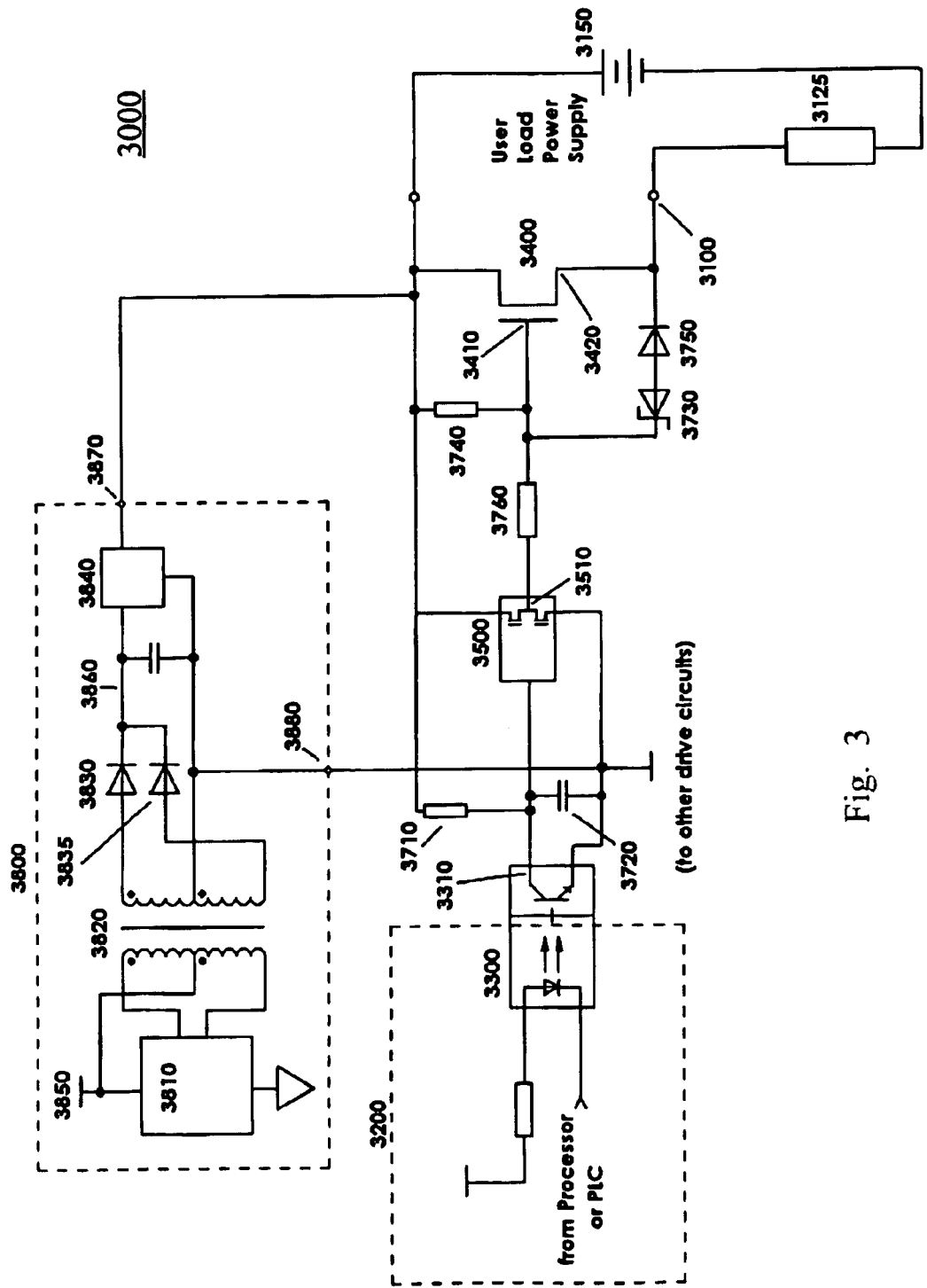
FIG. 3 is a schematic of an exemplary embodiment of a DC output circuit and floating power supply 3000.

FIG. 3 is a schematic of an exemplary embodiment of a DC output circuit and floating power supply 3000, that can provide a high speed wide voltage range sourcing output 3100 that is isolated from the logic control 3200. Output 3100 can be capable of switching at up to approximately 100,000 pulses per second or greater. Output 3100 can work with any voltage and/or voltage range desired from the user load power supply 3150, such as from approximately 0V up to approximately 30V and/or from approximately 0V up to approximately 1000V, including all values and subranges therebetween. Output 3100 can be capable of controlling user loads 3125 that are inductive loads and/or withstanding inductive kickback.

Certain exemplary embodiments can use high-speed optocouplers 3300 that are open collector (which can be less expensive than high speed optocouplers with totem pole outputs). However, the open collector optocoupler might not be able to turn the gate of P-Channel FET 3400 off quickly. So, a buffer 3500 with a totem pole output 3600 can be added between optocoupler 3300 and the gate 3410 of P-Channel FET 3400. Pull-up resistors 3710 and 3740, shown added to open collector 3310 on optocoupler 3300 and gate 3410 of FET 3400, can ensure that output 3100 would be off during power-up, power-down, and/or when the logic circuit 3200 was not on or powered. A pull-down capacitor 3720 on open collector 3310 of the optocoupler 3300 can prevent output 3100 from turning on during the presence of fast transient and/or burst noise.

Certain exemplary embodiments can control inductive loads. A zener diode 3730 and diode 3750 can connect from gate 3410 to the drain 3420 of P-channel FET 3400. When an inductive load is turned off, inductive forces can maintain the current that had been flowing while the load was on by increasing the voltage in the negative direction. The zener 3730 can clamp when the voltage becomes large enough to turn zener 3730, diode 3750 and gate 3410 on by conducting current through resistors 3740 and/or 3760. When the gate 3410 is on enough, the transistor 3400 can leak some current to the load to dissipate kickback energy of the user load 3125 that is an inductive load.

The output current of buffer 3500 might exceed its rating during this time because the buffer 3500 is turning gate 3410 off (high) and zener 3730 is trying to pull gate 3410 on (low). In order to prevent this occurrence, resistor 3760 can be added in between buffer 3500 and gate 3410. Resistor 3760 can effect the turn-off speed of FET output 3100.

In certain exemplary embodiments, since optocoupler 3300 and buffer 3500 can operate specifically with approximately 5 volts of regulated DC power, the circuit can include a P-Channel FET 3400 saturated in the on-state with approximately 5 volts on gate 3410.

In certain exemplary embodiments, a power supply 3800 can generate a regulated output of approximately 5 volts. Power supply 3800 can operate from approximately 0 volts up to approximately 30 DC volts of user load power supply 3150.

Certain exemplary embodiments can include an isolated floating power supply 3800. A push-pull switching regulator integrated circuit 3810, transformer 3820, and/or diodes 3830 and 3835 can convert a regulated voltage 3850 into an isolated unregulated voltage 3860. A regulator 3840 can regulate this voltage 3870. This output 3870 of the power supply 3800 can be referenced to the positive of the user load power supply 3150. The return 3880 of the power supply 3800 can be floating and always below the incoming voltage of the user load power supply 3150 no matter if the user load power supply 3150 voltage is 0V or 30V. Power supply 3800 can be used to supply power for numerous gates 3410 of transistors 3400 that are connected to the same user load power supply 3150.

Figure 4:
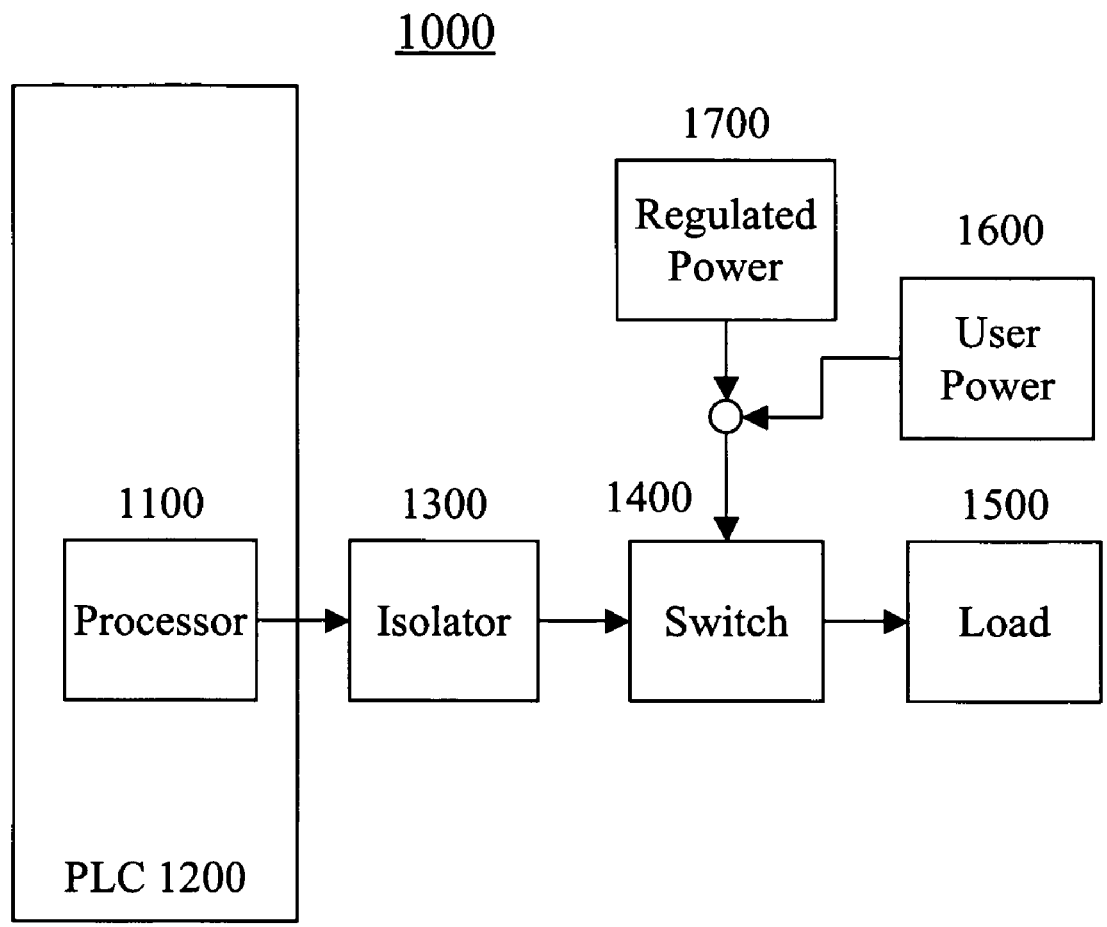
FIG. 4 is a block diagram of an exemplary embodiment of a system 4000.

FIG. 4 is a block diagram of an exemplary embodiment of a system 1000, and is identical to FIG. 1 except that programmable logic controller 1200 is shown as not comprising numbered elements other than processor 1100. That is, the numbered elements comprised by components of programmable logic controller 1200 can be varied.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, such as via an explicit definition, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A system, comprising:
   an electrical isolator adapted to couple a processor of a programmable logic controller to a user load;
   a transistor adapted to provide switching of a control signal provided by the processor for the user load, the control signal comprising a series of pulses having a frequency of greater than approximately 21,000 pulses per second;
   a totem pole output coupling the electrical isolator and the transistor and adapted to switch a gate of the transistor; and
   a power supply adapted to provide a regulated DC voltage to the gate of the transistor, the regulated DC voltage referenced to a reference pin of the transistor, a high side of the transistor referenced to a high side of the user load power supply, the user load power supply operable from less than approximately 6 volts to greater than approximately 23 volts.

2. The system of claim 1, wherein the electrical isolator is an optocoupler.

3. The system of claim 1, wherein the electrical isolator is an optocoupler comprising an open collector.

4. The system of claim 1, wherein the totem pole output is comprised electrical isolator.

5. The system of claim 1, wherein the transistor is a field effect transistor.

6. The system of claim 1, wherein the transistor is a P-channel field effect transistor.

7. The system of claim 1, wherein the control signal comprises a series of pulses.

8. The system of claim 1, wherein the control signal comprises a series of pulses having a frequency of greater than approximately 30,000 pulses per second.

9. The system of claim 1, wherein the control signal comprises a series of pulses having a frequency of greater than approximately 50,000 pulses per second.

10. The system of claim 1, wherein the control signal comprises a series of pulses having a frequency of greater than approximately 80,000 pulses per second.

11. The system of claim 1, wherein the control signal comprises a series of pulses having a frequency of greater than approximately 100,000 pulses per second.

12. The system of claim 1, wherein the power supply is electrically isolated from the processor.

13. The system of claim 1, wherein the user load power supply is operable at approximately 5 volts.

14. The system of claim 1, wherein the user load power supply is operable at less than approximately 5 volts.

15. The system of claim 1, wherein the user load power supply is operable at greater than approximately 30 volts.

16. The system of claim 1, further comprising a buffer coupled to the electrical isolator and the transistor.

17. The system of claim 1, further comprising a pull-up resistor coupled to the electrical isolator and the transistor.

18. The system of claim 1, further comprising a pull-up resistor coupled to the electrical isolator and the gate of the transistor and adapted to prevent switching of the control signal during predetermined events.

19. The system of claim 1, further comprising a pull-down capacitor coupled to the transistor and adapted to prevent switching of the control signal during predetermined events.

20. The system of claim 1, further comprising a first protective resistor coupled between the reference pin of the transistor and the gate of the transistor and a diode coupled in series with a zener diode connected between the gate of the transistor and a load side pin of the transistor and adapted to turn-on the transistor to absorb an inductive kick-back from an inductive user load.

21. The system of claim 20, further comprising a second protective resistor coupled between the totem pole output and the gate of the transistor and adapted to prevent an inductive kick-back from damaging the totem pole output.

22. The system of claim 1, further comprising a protective resistor coupled to the transistor and adapted to effect a turn-off speed of the transistor.

23. The system of claim 1, further comprising a diode coupled to the transistor and adapted to prevent an inductive kick-back from damaging the totem pole output.

* * * * *